US011811248B2

(12) United States Patent
Delevski

(10) Patent No.: US 11,811,248 B2
(45) Date of Patent: Nov. 7, 2023

(54) VEHICLE GENERATOR USING BATTERY CHARGING PROFILES

(71) Applicant: C.E. Niehoff & Co., Evanston, IL (US)

(72) Inventor: Dimitar Delevski, Northbrook, IL (US)

(73) Assignee: C.E. Niehoff & Co., Evanston, IL (US)

( * ) Notice: Subject to any disclaimer, the term of this patent is extended or adjusted under 35 U.S.C. 154(b) by 520 days.

(21) Appl. No.: 15/216,142

(22) Filed: Jul. 21, 2016

(65) Prior Publication Data
US 2018/0026457 A1    Jan. 25, 2018

(51) Int. Cl.
*H02J 7/00*        (2006.01)
*H02J 7/14*        (2006.01)

(52) U.S. Cl.
CPC .......... *H02J 7/0024* (2013.01); *H02J 7/0071* (2020.01); *H02J 7/1423* (2013.01); *H02J 7/00034* (2020.01); *H02J 7/0048* (2020.01); *Y02T 10/70* (2013.01)

(58) Field of Classification Search
CPC .................................................... H02J 7/1476
USPC .......................................................... 320/104
See application file for complete search history.

(56) References Cited

U.S. PATENT DOCUMENTS

| 4,335,344 | A |   | 6/1982  | Gant           |           |
|-----------|---|---|---------|----------------|-----------|
| 5,623,197 | A | * | 4/1997  | Roseman        | H02J 7/1453 |
|           |   |   |         |                | 320/134   |
| 5,652,501 | A |   | 7/1997  | McClure et al. |           |
| 5,744,937 | A |   | 4/1998  | Cheon          |           |
| 6,014,013 | A |   | 1/2000  | Suppanz et al. |           |
| 6,163,135 | A |   | 12/2000 | Nakayama et al.|           |
| 6,217,620 | B1|   | 4/2001  | Park et al.    |           |
| 6,218,804 | B1|   | 4/2001  | Toriyama et al.|           |
| 6,225,784 | B1|   | 5/2001  | Kinoshita et al.|          |
| 6,225,788 | B1|   | 5/2001  | Kouzu et al.   |           |
| 6,229,285 | B1|   | 5/2001  | Ding           |           |
| 6,252,373 | B1| * | 6/2001  | Stefansson     | H02J 7/00711 |
|           |   |   |         |                | 320/106   |

(Continued)

FOREIGN PATENT DOCUMENTS

CN       203674347 U      6/2014
GB         2288928 A     11/1995
(Continued)

OTHER PUBLICATIONS

Sep. 9, 2019—(GB) Examination Report—App GB1903583.1.
(Continued)

*Primary Examiner* — Arun C Williams
(74) *Attorney, Agent, or Firm* — Banner & Witcoff, Ltd.

(57) ABSTRACT

A system for generator-based charging of a battery module may include the battery module, a sensor located adjacent the battery module, a generator controller comprising a processor and a non-transitory memory device storing instructions. The instructions, when executed by the processor, cause the generator controller to analyze one or more sensor signals received from the sensor. The sensor signals may correspond to a condition of the battery module. The generator controller may then calculate, based on the one or more sensor signals, a generator current value for use in charging the battery module. Next, the generator controller may generate a control signal comprising a command that may cause the generator to provide a charging current having the current value.

20 Claims, 6 Drawing Sheets

(56) References Cited

U.S. PATENT DOCUMENTS

| | | |
|---|---|---|
| 6,259,254 B1 | 7/2001 | Klang |
| 6,313,608 B1 | 11/2001 | Varghese et al. |
| 6,316,914 B1 | 11/2001 | Bertness |
| 6,331,762 B1 | 12/2001 | Bertness |
| 6,353,306 B1 | 3/2002 | Mixon |
| 6,424,157 B1 | 7/2002 | Gollomp et al. |
| 6,426,608 B2 | 7/2002 | Amano et al. |
| 6,532,425 B1 | 3/2003 | Boost et al. |
| 6,549,014 B1 | 4/2003 | Kutkut et al. |
| 6,624,618 B2 | 9/2003 | Kemahan et al. |
| 6,909,287 B2 | 6/2005 | Bertness |
| 7,057,376 B2 | 6/2006 | Cook et al. |
| 7,116,109 B2 | 10/2006 | Klang |
| 7,129,675 B2 | 10/2006 | Brecht |
| 7,352,154 B2 | 4/2008 | Cook |
| 7,518,375 B2 | 4/2009 | Kim et al. |
| 7,619,417 B2 | 11/2009 | Klang |
| 7,622,929 B2 | 11/2009 | Tinnemeyer et al. |
| 7,683,576 B2 | 3/2010 | Tien et al. |
| 7,688,074 B2 | 3/2010 | Cox et al. |
| 7,705,602 B2 | 4/2010 | Bertness |
| 7,714,736 B2 | 5/2010 | Gielniak |
| 7,928,690 B2 | 4/2011 | Koch et al. |
| 8,035,395 B2 | 10/2011 | Suzuki et al. |
| 8,089,345 B2 | 1/2012 | Berglund et al. |
| 8,120,329 B2 | 2/2012 | Asada |
| 8,125,189 B2 | 2/2012 | Formenti |
| 8,129,940 B2 | 3/2012 | Abe |
| 8,142,237 B2 | 3/2012 | Condamin et al. |
| 8,148,949 B2 | 4/2012 | Oliveira et al. |
| 8,198,900 B2 | 6/2012 | Bertness et al. |
| 8,203,311 B2 | 6/2012 | Takahashi et al. |
| 8,232,763 B1 | 7/2012 | Boot |
| 8,234,087 B2 | 7/2012 | Majima |
| 8,264,202 B2 | 9/2012 | Sahu et al. |
| 8,305,034 B2 | 11/2012 | Rubio |
| 8,306,690 B2 | 11/2012 | Bertness et al. |
| 8,386,199 B2 | 2/2013 | Goff et al. |
| 8,437,908 B2 | 5/2013 | Goff et al. |
| 8,467,984 B2 | 6/2013 | Gering |
| 8,476,864 B2 | 7/2013 | Ferre Fabregas et al. |
| 8,536,825 B2 | 9/2013 | Kishiyama et al. |
| 8,552,693 B2 | 10/2013 | Paryani |
| 8,558,512 B2 | 10/2013 | Iles et al. |
| 8,564,242 B2 | 10/2013 | Hansford et al. |
| 8,581,548 B2 | 11/2013 | Goff et al. |
| 8,624,560 B2 | 1/2014 | Ungar et al. |
| 8,643,342 B2 | 2/2014 | Mehta et al. |
| 8,653,787 B2 | 2/2014 | Cunanan et al. |
| 8,674,654 B2 | 3/2014 | Bertness |
| 8,754,614 B2 | 6/2014 | Paryani et al. |
| 8,754,653 B2 | 6/2014 | Vonderhaar et al. |
| 8,820,445 B2 | 9/2014 | Kikuchi |
| 8,823,324 B2 | 9/2014 | Brandon, II |
| 8,825,417 B1 | 9/2014 | Krolak et al. |
| 8,872,516 B2 | 10/2014 | Bertness |
| 8,878,483 B2 | 11/2014 | Darroman et al. |
| 8,890,467 B2 | 11/2014 | Mmquist et al. |
| 8,890,480 B2 | 11/2014 | Vian et al. |
| 8,897,943 B2 | 11/2014 | Sheidler et al. |
| 8,932,086 B2 | 1/2015 | Thimon et al. |
| 8,947,050 B2 | 2/2015 | Gale et al. |
| 8,972,213 B2 | 3/2015 | Zhang et al. |
| 8,975,886 B2 | 3/2015 | Shiek |
| 9,026,347 B2 | 5/2015 | Gadh et al. |
| 9,156,356 B2 | 10/2015 | Rini et al. |
| 9,163,600 B2 | 10/2015 | Neet |
| 9,197,089 B2 | 11/2015 | Choe et al. |
| 9,199,543 B2 | 12/2015 | Brabec |
| 9,214,822 B2 | 12/2015 | Hartley et al. |
| 9,219,294 B2 | 12/2015 | Albsmeier et al. |
| 9,236,748 B2 | 1/2016 | Barsukov et al. |
| 9,260,031 B2 | 2/2016 | Ghosh et al. |
| 9,276,416 B2 | 3/2016 | Kroenke et al. |
| 9,296,302 B2 | 3/2016 | Birke et al. |
| 2007/0182385 A1 | 8/2007 | Ueda et al. |
| 2008/0071483 A1 | 3/2008 | Eaves |
| 2009/0058373 A1 | 3/2009 | Graovac et al. |
| 2009/0184692 A1* | 7/2009 | Owens, Jr. ................ H02J 7/14 322/23 |
| 2009/0210736 A1 | 8/2009 | Goff et al. |
| 2009/0259421 A1 | 10/2009 | Pop et al. |
| 2009/0273320 A1* | 11/2009 | Ungar ................ H01M 4/5815 320/162 |
| 2009/0319209 A1 | 12/2009 | Lim |
| 2010/0141210 A1 | 6/2010 | Shaffer, Jr. |
| 2010/0179778 A1 | 7/2010 | Goff et al. |
| 2010/0217551 A1 | 8/2010 | Goff et al. |
| 2010/0292942 A1 | 11/2010 | Golf et al. |
| 2011/0199054 A1 | 8/2011 | Burchardt et al. |
| 2011/0248678 A1 | 10/2011 | Wade et al. |
| 2011/0291621 A1* | 12/2011 | Iles ................ H01M 10/4257 320/145 |
| 2012/0041622 A1* | 2/2012 | Hermann ............ H01M 16/006 701/22 |
| 2012/0056585 A1 | 3/2012 | Mariels |
| 2012/0098481 A1 | 4/2012 | Hunter et al. |
| 2012/0105009 A1 | 5/2012 | Yao |
| 2013/0090900 A1 | 4/2013 | Gering |
| 2013/0127611 A1 | 5/2013 | Bernstein et al. |
| 2013/0249468 A1 | 9/2013 | Bajjur et al. |
| 2013/0249469 A1* | 9/2013 | Pahlevaninezhad ........................ H02M 1/4225 320/107 |
| 2013/0278225 A1 | 10/2013 | Dietze et al. |
| 2014/0023888 A1 | 1/2014 | Fulop et al. |
| 2014/0062415 A1* | 3/2014 | Barsukov ................ H02J 7/00 320/134 |
| 2014/0203077 A1 | 7/2014 | Gadh et al. |
| 2015/0077040 A1 | 3/2015 | Longdon et al. |
| 2015/0097518 A1 | 4/2015 | Bishop et al. |
| 2015/0168499 A1 | 6/2015 | Palmisano |
| 2015/0191100 A1 | 7/2015 | Schindler |
| 2015/0236523 A1 | 8/2015 | Takano et al. |
| 2016/0006272 A1* | 1/2016 | Greening ............ H02J 7/0008 320/162 |
| 2016/0052410 A1 | 2/2016 | Zhou |
| 2016/0089994 A1 | 3/2016 | Keller et al. |
| 2016/0107526 A1 | 4/2016 | Jin et al. |
| 2016/0181838 A1* | 6/2016 | Bryngelsson ........... B60L 58/13 320/112 |
| 2017/0077717 A1* | 3/2017 | Lundgren ............. H02J 7/0088 |
| 2017/0194887 A1 | 7/2017 | Kataoka et al. |
| 2017/0264104 A1 | 9/2017 | Horitake et al. |
| 2018/0026457 A1 | 1/2018 | Delevski |

FOREIGN PATENT DOCUMENTS

| | | |
|---|---|---|
| JP | 2014096970 A * | 5/2014 |
| WO | 2014100937 A1 | 7/2014 |
| WO | 2016009175 A1 | 1/2016 |

OTHER PUBLICATIONS

Apr. 8, 2020—(WO) WO & ISR—App. No. 10201705945S.
Nov. 18, 2020—(WO) Second Written Opinion—App. No. 10201705945S.
Aug. 27, 2021—(SG) Examination Report—App. No. 10201705945S.

* cited by examiner

VEHICLE GENERATOR USING BATTERY CHARGING PROFILES

FIELD OF THE INVENTION

This application relates generally to generator-based charging of batteries and more particularly to use of a controller for controlling an output of a generator to charge a battery module based on a battery charging profile and signals received from a smart sensor located adjacent to the battery module.

BACKGROUND

Electrical devices and devices containing multiple electrical components have become increasingly reliant on batteries for power. In many applications (e.g., automotive power systems, vehicle power systems, portable electronics, etc.), rechargeable batteries may be used. Such rechargeable batteries may include one or more batteries in a battery module, such as lithium-ion batteries, nickel-cadmium batteries, lead-acid batteries, and/or other battery types or combination of battery types. In an illustrative example, lithium ion batteries have become increasingly common in many applications, such as portable electronics, vehicular electrical systems, and the like. Advantages of lithium ion batteries include a favorable energy to weight ratio, no memory effect, a low rate of charge loss when not in use, and the like. In some applications (e.g., vehicular applications, industrial applications, aerospace applications, etc.), lithium ion batteries may be chosen based on the above mentioned attributes and/or for other reasons, such as a high energy density, a high power density, and the like.

In traditional recharging applications for Li-ion batteries, a one-step (e.g., constant current) or two-step (constant current/constant voltage) charging process may be used. In an illustrative example, a two-step process may include first charging the battery using a constant current (e.g., a current limit) until the volt limit has been reached (e.g., a cell voltage limit). Next, a maximum voltage per cell may be applied until the charging current falls below a threshold level, such as a multiple of a rated discharge current ($I_d$) (e.g., $0.05*I_d$, $0.1*I_d$, $0.2*I_d$, etc.). For other battery chemistries, a same or different charging scheme may be utilized based on certain properties of the particular battery chemistry. For example, a lead acid battery may be charged by applying a constant voltage (e.g., a rated battery voltage) until the desired battery voltage has been reached.

In some cases, such as vehicular applications, industrial applications, etc., a battery charging system may be generator based. However, in some applications, the above-mentioned battery charging techniques may fail to efficiently charge batteries, or even may cause damage to battery modules because different environmental or electrical conditions may be overlooked. In other cases, a battery module may use mixed battery types, either as an intentional combination or an inadvertent combination. In such cases, a charging method for one battery type may actually damage or cause a failure of one or more components of the battery module. For example, a specialized battery charger may be used, but such use may increase costs associated with use of the battery module, increase weight of the battery module components and/or supporting equipment (e.g., the battery charger, etc.), increase system complexity (e.g., additional components that may be lost or damaged, etc.), and the like As such, a need has been recognized for a generator-based system capable of efficiently charging a battery module without use of a separate battery charger.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

In an illustrative example, a system for generator-based charging of a battery module may include the battery module, a sensor located adjacent the battery module, a generator controller comprising a processor and a non-transitory memory device storing instructions. The instructions, when executed by the processor, cause the generator controller to analyze one or more sensor signals received from the sensor. The sensor signals may correspond to a condition of the battery module. The generator controller may then calculate, based on the one or more sensor signals, a generator current value for use in charging the battery module. Next, the generator controller may generate a control signal comprising a command that may cause the generator to provide a charging current having the current value.

The details of these and other aspects of the disclosure are set forth in the accompanying drawings and description below. Other features and advantages of aspects of the disclosure will be apparent from the description and drawings.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps may be optional. It will also be appreciated with the benefit of this disclosure that one or more components illustrated in the accompanying figures may be positioned in other than the disclosed arrangement and that one or more of the components illustrated may be optional, in which.

DETAILED DESCRIPTION

Aspects of the present disclosure are directed toward generator-based charging of a battery module.

In the following description of various example structures and methods in accordance with the invention, reference is made to the accompanying drawings, which form a part hereof, and in which are shown by way of illustration various fitness devices and systems using fitness devices in accordance with various embodiments of the invention. Additionally, it is to be understood that other specific arrangements of parts and structures may be utilized and structural and functional modifications may be made without departing from the scope of the invention.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof, as well as additional items and equivalents thereof. As used in this description, a set refers to a collection of one or more elements.

Figure 1:
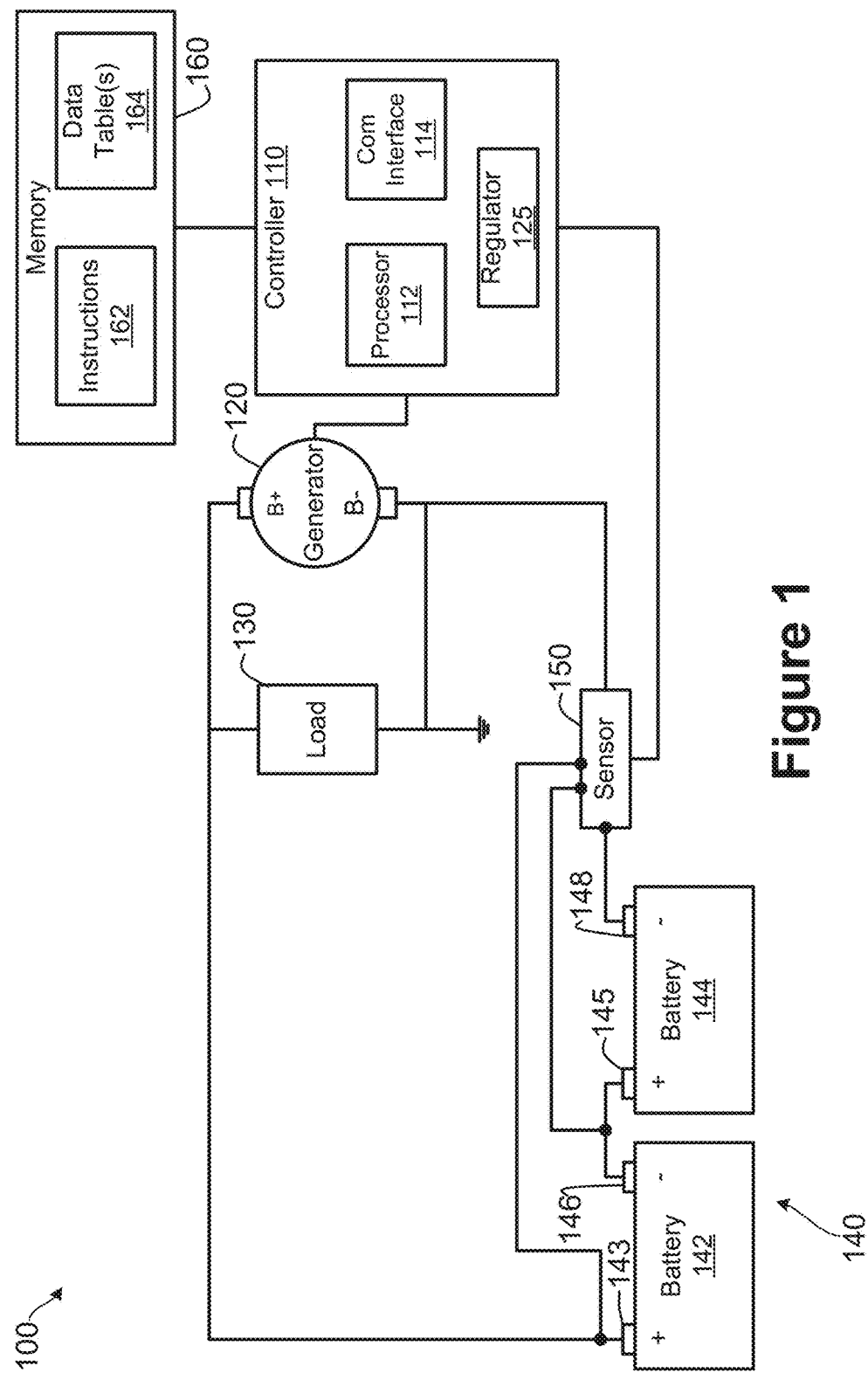
FIG. 1 shows an illustrative block diagram of a generator-based battery charging control system utilizing one or more charging profiles according to aspects of the disclosure.

FIG. 1 shows an illustrative block diagram of a generator-based battery charging system 100 utilizing one or more charging profiles according to aspects of the disclosure. For example, the generator-based battery charging system may include a controller 110, a generator 120, an electrical load 130 receiving electrical power from the generator 120, a battery module 140 electrically coupled to the generator, and one or more sensors (e.g., a "smart" sensor 150, individual sensors, etc.). In some cases, the controller 110 may include a communication interface 114 and a processor 112. In some cases, the controller 110 may also include one or more memory devices 160 (e.g., internal and/or external memory devices) that may be configured to store instructions 162 processed by the processor 112 and one or more data tables (e.g., charging profiles, etc.).

In some cases, the generator 120 may be electrically coupled to the electrical load via two or more electrical connections (e.g., B+, B−, etc.) to provide electrical power to the electrical load 130. In an illustrative example, the generator 120 may be an alternator in a vehicle. In some cases, the generator 120 may be a stand-alone electrical generator configured to utilize another energy source (e.g., a fossil fuel engine, a wind turbine, etc.) to provide electrical energy to the electrical load 130. The generator 120 may include a field coil (not shown) and one more stator windings (not shown), where the field coil may generate a magnetic field when a field current flows through the field coils. This magnetic field may interact with the one or more stator windings to induce a voltage across one or more stators. The stator voltage may then be used to provide a generator output current for use in powering the electrical load 130.

In an illustrative example, the generator 120 may be an alternator installed in a vehicle, such as an automobile, a truck, a bus, a military vehicle, an airplane, a boat, and/or the like. In such cases, the electrical load 130 may include one or more electrical components of the vehicle, such as a heating element, a cooling fan, headlights, an air conditioning unit, a pump, a radio, a battery module, and the like. In some cases, the vehicle alternator may also be used to provide power to one or more electrical devices (e.g., a portable electronic device, a mobile phone, a GPS unit, etc.) and/or external vehicle components (e.g., a trailer, running lights, emergency lights, etc.). Some vehicles, such as emergency vehicles, which may include a number of electrical components that cannot be without power. The battery module 140 may be used to provide electrical power to the electrical load 130, or externally connected electrical devices, when sufficient electrical power is not or cannot be generated by the generator 120. For example, the battery module 140 may provide electrical energy to the electrical load when the vehicle's engine has been shut down, when the generator 140 has experienced a fault, when the electrical load 130 has increased to or beyond the generation capacity of the generator 120, and the like. In some cases, the generator 120 may be configured with two or more electrical terminals (e.g., a B+ terminal, a B− terminal, a B2+ terminal, etc.) to provide electrical power at one or more voltage levels in a range between about 10V to about 80 V, such as via a 12 V output terminal, a 14 V output terminal, a 28 V output terminal, a 37 V output terminal, a 74 V output terminal and the like.

In another illustrative example, the generator 120 may be a stand-alone generator or other such generator for use outside a vehicular environment. In such cases, the generator 120 may be used in an industrial application, a residential application, a remote installation application, a lighting application, and the like. Such generators may include or be connected to a device (e.g., a fuel powered engine, a renewable energy powered motor, etc.) that provides a motive force to provide the mechanical energy to spin a rotor of the generator 120 to generate electrical power, as discussed above. In such cases, the generator 120 may be used to provide electrical power to a number of electrical devices and/or to provide power to be stored in one or more battery modules for use in providing power to an electrical device. For example, an electrical generator may be used to power an electrical device (e.g., a pump, a lighting unit, a computer installation, etc.) in locations remote from an electrical grid connection, at a location in which electrical power delivery has periods of outages, or in application in which electrical power is critical, such as at a hospital or other similar healthcare facility.

In some cases, the generator 120 may be configured to generate alternating current (AC) voltages at a frequency corresponding to the rotation speed of the rotor. In many cases, this electrical energy is output as a rectified direct current (DC) voltage (e.g., via the B+ and B− terminals). In some cases, the generator 120 may be configured to output an AC voltage at a regulated frequency in addition to or in place of the DC output voltage, such as a 120V output at 60 Hz, 220V output at 50 Hz, and the like. To provide regulated DC voltages, the generator-based battery charging system 100 and/or the generator 120 may include a voltage regulator. The voltage regulator may operate to regulate the generator output voltage(s) at one or more pre-defined constant voltage levels as the speed of the generator 120 and electrical load 130 may vary during operation. For example, electrical devices included in the electrical load may be connected, disconnected, enabled, or disabled during operation of the generator 120. This variable load operation may cause disturbances (e.g., a voltage spike, a transient current, etc.) as the devices operate. In an illustrative example, a motor or heating element connected as at least a portion of the electrical load 130 may draw a large inrush current upon power up. These transient load conditions may affect the operation of the generator 120. Additionally, in vehicular operations, the rotation speed of the rotor may correspond to the rotational speed of the vehicle's engine, where this variable rotational speed may cause the AC voltage generated via the interaction between the field coils and the rotor to be generated at a frequency with some variation. In such cases, the voltage regulator may be used to regulate the conversion of AC electrical energy to DC electrical energy at or near a predefined set point. In some cases, the regulator 125 may be incorporated into the generator 120, incorporated into the controller 110 as shown, or may be incorporated as an external device installed adjacent to the generator 120. In some cases, the regulator 125 may be configured to provide the regulated output voltage from the generator 120 via the B+ and B− terminals.

In some cases, the regulator may include one or more power electronic devices such as diodes, thyristors, silicon controlled rectifiers (SCRs), gate turn-on thyristors (GTOs), Triacs, bipolar junction transistors (BJTs), power transistors (e.g., insulated gate bipolar transistors (IGBTs), power metal oxide semiconductor field-effect transistors (MOSFETs), MOS controlled thyristors (MCTs), integrated gate-commutated thyristors (IGCT), and the like. The voltage regulator may include one or more converters, such as AC/DC converters, DC/DC converters and the like. For example, the regulator may include a diode rectifier to convert an AC input voltage to an unregulated DC voltage and a DC/DC regulator to convert the unregulated DC voltage to a regulated DC output voltage and/or current. In some cases, the regulator 125 may control an AC/DC converter to provide a regulated DC output voltage and/or current. The regulator 125 may be configured to switch one or more switching devices (e.g., an IGBT, a BJT, an SCR, an IGCT, etc.), along with additional electrical components (e.g., resistors, capacitors, inductors, transformers, etc.) to provide a regulated DC output via one or more power conversion circuits, such as a boost converter, a buck converter, a Cúk converter, a flyback converter, a SEPIC converter, a forward converter, a full bridge converter, and the like.

In some cases, the controller 110 may be configured to control an output (e.g., a voltage, a current, both a voltage and a current) of the generator. For example, the controller 110 may store instructions 162 in one or more non-transitory memory devices to be processed by the processor 112 to control the output of the generator at a desired set-point. In some cases, the instructions 162 may cause the output of the generator to change over time based on feedback received at the controller via the communication interface 114. The one or more non-transitory memory devices 160 may be any suitable storage, including, but not limited to RAM, ROM, EPROM, flash memory, a hard drive, and so forth. In some cases, the instructions 162 and/or the data tables 164 may be pre-loaded on the memory devices 160. In some cases, at least a portion of the instructions 162 and/or the data tables 164 may be loaded into memory using one or more communication channels (e.g., a serial communication connection, a parallel communication connection, a network communication connection, a wireless communication network, etc.) via the communication interface 114. The communication interface 114 may include one or more network connections, one or more inputs for receiving sensor signals from the sensor 150, a communication interface for communicating data to and/or from the sensor, a command output to facilitate communication of a control signal to the generator to control operation of the generator, and/or one or more parallel, serial or network ports to allow a user to upload and/or download information and/or instructions into the memory 160.

One or more aspects of the disclosure may be embodied in computer-usable data or computer-executable instructions (e.g., the instructions 162), such as in one or more modules, executed by the processor 112 to perform the operations described herein. Generally, modules include routines, programs, objects, components, data structures, and the like that perform particular operations or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein. In some cases, the data tables 164 may be stored as data structures (e.g., a tabular data structure), an XML, file, a binary file, and/or the like.

As will be discussed below with respect to FIG. 7, the processor 112 may process instructions 162 to regulate charging of the rechargeable battery module 140 based on battery module information and information from the sensor 150 (e.g., a battery voltage, a battery current, a battery temperature, an ambient temperature, historical battery operation data, and the like.). In an illustrative example, the processor 112 may process instructions 162 that may cause the controller 110 to monitor conditions related to the battery module operation, such as a state of charge (SoC) of the battery module 140, battery voltage, battery current, battery temperature, ambient temperature, and the like. Based on this information, the controller 110 may determine that the battery module conditions have met predetermined criteria for initiating a recharge-operation sequence. Such predetermined criteria may be stored in the memory 160 as a data table 164, a data structure, or the like. For example, a state of charge criteria may correspond to a threshold percentage of the maximum capacity of the battery module, under which the controller 110 may initiate the recharge of the battery module 140. For example, the state of charge threshold may be a predetermined percentage of maximum capacity, such as 5%, 10%, 20%, 40% and the like. Similarly, the predetermined criteria may correspond to a depth of discharge (DOD) threshold condition, where the depth of discharge threshold may correspond to a percentage of battery capacity that has been discharged and expressed as a percentage. For example, the DOD threshold may be a predetermined percentage of discharge battery capacity, such as 95%, 90%, 80%, and the like. Other battery parameters that may be used by the controller 110 when to initiate a battery recharge operation may include a terminal voltage threshold that may correspond to SoC and the charging/discharge current, an open-circuit voltage threshold which may correspond to SoC and/or an internal resistance threshold which may correspond to SoC. For example, as internal resistance increases the battery efficiency may decrease and thermal stability may be reduced as more of the charging energy may be converted to heat. In some cases, the predetermined criteria may also be dependent upon other parameters that may be sensed in near-real time, such as temperature, voltage and current. For example, first threshold values may be used at a first temperature and second threshold values may be used at a second temperature.

Once the controller 110 identifies whether recharge criteria has been met (e.g., a SoC threshold, a DOD threshold, a voltage threshold, a current threshold, a temperature threshold, and/or an internal resistance threshold, etc.), the controller 110 may identify a charging profile for use in controlling the battery recharge process. The charging profile may be stored in the memory device as a table, xml file, data structure and the like. Each charging profile may depend on a battery module configuration, current (near real-time) battery status information, current (near real-time) ambient conditions, and the like. When a charging profile has been selected, the controller 110 may process battery status information sensed by the sensor 150 to identify a current battery voltage, temperature and/or current value and may generate a control signal for communication to the generator 120. In applications having a generator 120 outputting two or more voltage level outputs, the controller 110 may monitor each voltage level circuit independently and generate a control signal to control recharge operation of the modules of each circuit. The control signal may cause the generator 120 to output electrical energy at a specified current level and/or at a specified voltage level based on the selected charging profile and the current battery conditions.

The controller 110 may monitor the battery voltage, battery current, the battery temperature, ambient temperature, and/or other parameters to determine whether a battery charged threshold has been met. If so, the controller 110 may output an indication that the battery module has been charged. If not, the controller 110 may identify whether a charging profile threshold has been met. For example, in some cases, a battery module 140 may be associated with one or more charging profiles, where each charging profile may correspond to a predetermined condition of the battery module. For example, for some battery modules, such as battery modules including a single battery type, different charging profiles may be defined for different battery temperatures or ranges of battery temperatures. In another example, for battery modules including mixed battery types, a charging profile may be defined based on different charging currents or ranges of charging currents. If a temperature or current threshold condition has been met, the controller 110 may select a different charging profile based on the current (e.g., near real-time) battery module parameters. If not, the controller 110 may continue the battery module recharge process using the same earlier selected charging profile. Once the controller 110 has indicated the battery module 140 has been recharged (e.g., battery parameter(s) have reached predetermined criteria), the controller 110 may continue monitoring of the battery parameters to identify when to initiate the next battery recharge process.

Figure 3A:
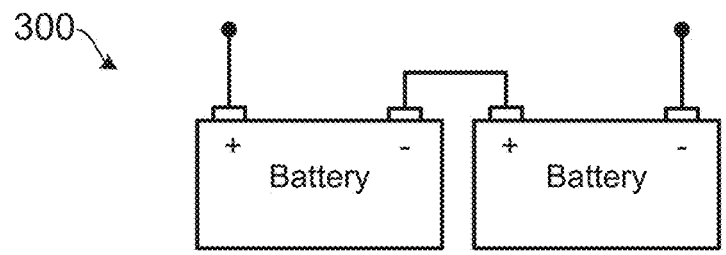
FIGS. 3A, 3B, and 3C show illustrative battery module configurations according to aspects of the disclosure.
Figure 3B:
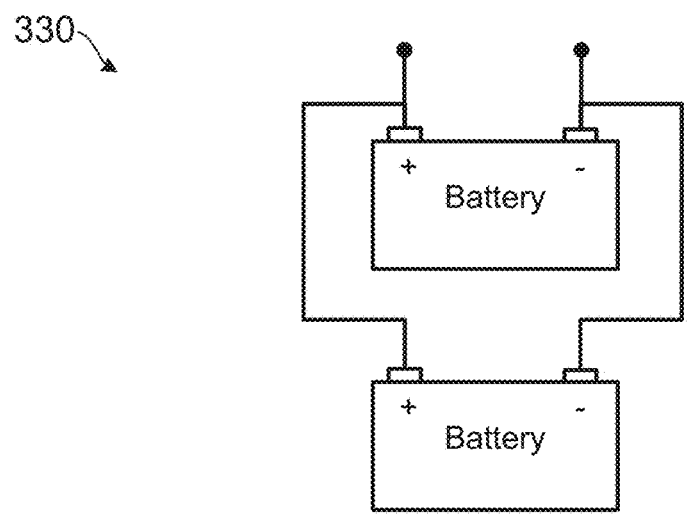
Figure 3C:
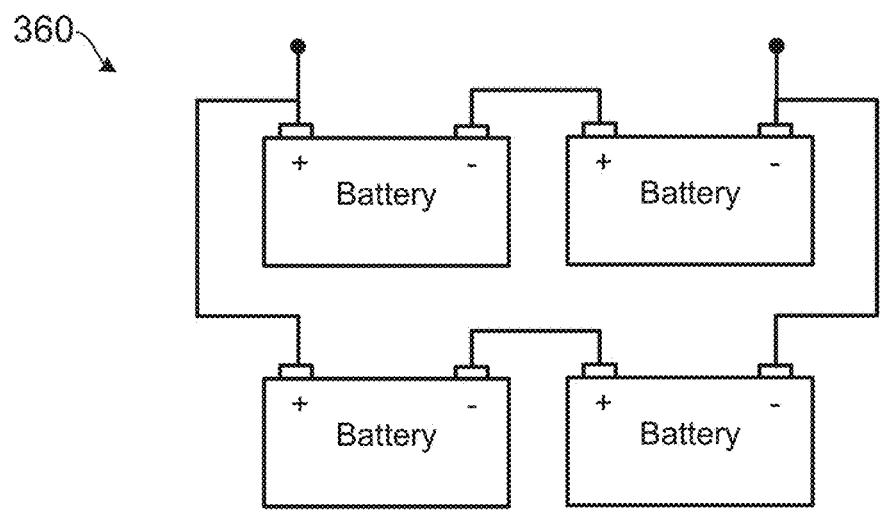

In some cases, the battery module 140 may include one or more batteries 142, 144 or battery cells. The batteries and/or battery cells included in the battery module 140 may be connected in one or more configurations. For example, FIGS. 3A, 3B, and 3C show illustrative battery module configurations according to aspects of the disclosure. FIG. 3A and FIG. 1 show an illustrative series connected battery module 300, 140. FIG. 3B shows an illustrative parallel connected battery module 330, and FIG. 3C shows an illustrative battery module 360 having both series connected and parallel connected batteries. While these figures show the battery modules including individual batteries, the battery modules may include one or more batteries, battery cells or combinations of batteries, where one or more batteries include multiple cells. The battery modules 140, 300, 330, and 360 may include one or more batteries of a single type such as lithium-ion batteries, nickel-cadmium batteries, and lead-acid batteries. In some cases, the battery modules 140, 300, 330, and 360 may include a combination of battery types.

The sensor 150 may be a single sensor (e.g., a "smart" sensor) capable of measuring one or more conditions corresponding to battery module operation and/or may be capable of logging battery module operation data over time. In some cases, the sensor 150 may comprise a number of discrete sensors each capable of measuring one or more battery conditions, such as individual voltage sensors, current sensors, temperature sensors and the like. The sensor 150 may be located adjacent the battery module 140, such as near a terminal (e.g., the second negative terminal 146). in some cases, the sensor may be operably coupled to a plurality of locations at or near the battery module 140, such as at different positive terminals 143, 145 and/or negative terminals 146, 148. The sensor 150 may be communicatively coupled to the controller 110 to communicate current and/or historical information corresponding to battery operation. The sensor 150 may also be configured to monitor one or more of a generator voltage, a generator current, a generator temperature, a ground current, and the like.

Figure 2:
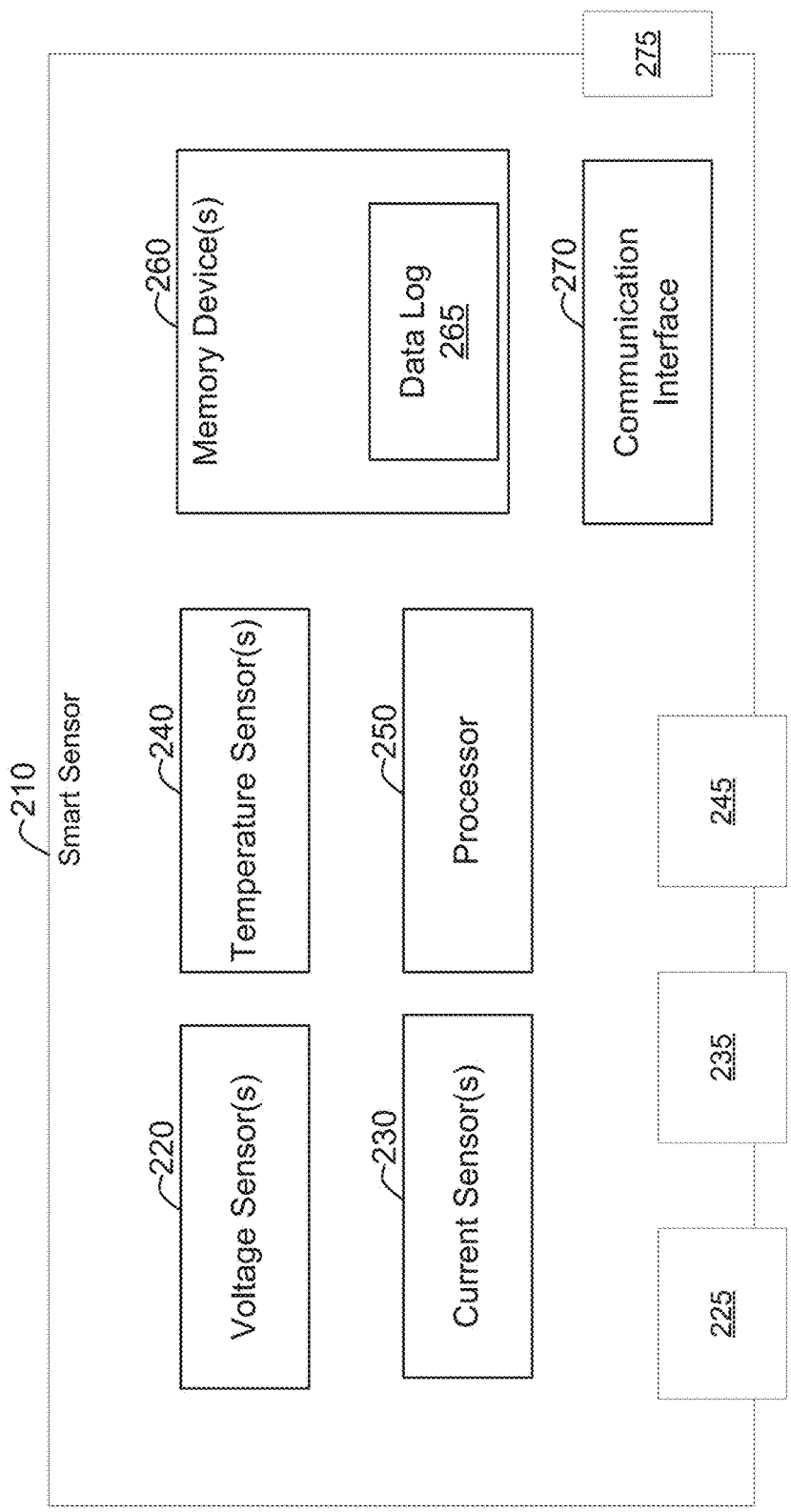
FIG. 2 shows an illustrative "smart" sensor that may be used in a battery charging control system according to aspects of the disclosure.

FIG. 2 shows an illustrative "smart" sensor 210 (e.g., the sensor 150) that may be used in a battery charging control system according to aspects of the disclosure. The smart sensor 210 may include one or more voltage sensors 220, one or more current sensors 230, one or more temperature sensors, a processor 2550, a memory device 260, and a communication interface 270. The smart sensor 210 may also include one or more ports for sensing and/or communication information, such as a voltage sense port 225, a current sense port 235, a temperature sense port 245 and/or a communication port 275. In some cases, the memory devices 260 may be used to store computer executable instructions to be executed by the processor 250 to process and/or log sensor information. The voltage sensors 220 may include one or more voltage sensors configured to sense a voltage at one or more locations within the generator-based battery charging system 100, such as at a battery terminal 143, 146, 145, and 148, at a generator terminal (e.g., B+, B−, etc.), or other such location. The current sensors 230 may include one or more current sensors configured to sense a current at one or more locations within the generator-based battery charging system 100, such as at a battery terminal 143, 146, 145, and 148, at a generator terminal (e.g., B+, B−, etc.), or other such location. The temperature sensors 240 may include one or more temperature sensors configured to sense a temperature at one or more locations within the generator-based battery charging system 100, such as at a battery location (e.g., internal to the battery module, at an exterior surface of a battery module, etc.) and/or to sense an ambient temperature corresponding to the location of the generator-based battery charging system 100.

In some cases, the voltage sensors 220 may comprise a voltage transducer, a resistor circuit, or other such voltage sensing technology. The current sensors 230 may comprise one or more of a hall effect sensor, a transformer or clamp-based sensor, a resistor circuit or other such current sensing apparatus. The temperature sensors 240 may include one or more temperature sensing technologies, such as a thermistor, a thermocouple, a thermometer, or other such temperature sensing apparatus. The voltage sensors 220, current sensors 230, and/or the temperature sensors 240 may be physically located within a smart sensor housing or external to the smart sensor housing.

The processor 250 may be configured to receive sensor signals from one or more of the voltage sensors 220, current sensors 230, and/or the temperature sensors via the ports 225, 235, and 245. The processor 250 may be configured to store the sensor data in the memory devices 260, as raw data, as processed data or both. The processor 250 may be configured to sample the sensor data at a predetermined rate, at a near-real time rate, or upon different triggering conditions. The smart sensor may compile a data log 265 of battery module operational information and periodically communicate the data log to the controller 110 or to a user. The smart sensor 210 may communicate the data a predetermined intervals or in answer to a received request. The communication interface 170 may include one or more serial communication interfaces, parallel communication interfaces, network communication interfaces and/or analog communication interfaces. For example, the smart sensor may be configured to communication analog sensor information to the controller 110 via one or more analog communication ports corresponding to one or more of a current signal, a voltage signal, and/or a temperature signal. In some cases, the processor may process sensor information to calculate a state of charge of the battery module, a depth of charge of the battery module, or other such calculation. In some cases, the controller 110 may send a command to the smart sensor to sense current, voltage and/or temperature information from the battery module. In some cases, the controller 110 may communicate a sampling frequency at which the current, voltage and/or temperature signals may be sampled and/or communicated to the controller.

In some cases, the smart sensor 210 may be configured to be attached to a negative terminal 146, 148 of the battery 142, 144 within the battery module 140. The smart sensor may be configured to monitor the charging and discharging current, voltage, and/or temperature of the battery via the voltage sensors 220, the current sensors 230, and the temperature sensors 240. The smart sensor may be configured to monitor these parameters with a high level of precision (e.g., ±0.01, etc.). In doing so, the smart sensor provides battery information to allow for proactive power management of a plurality of electrical devices associated with a vehicle or other application (e.g., portable electronic devices, industrial applications, transportation applications, residential applications, and the like). By using the smart sensor, many advantages may be realized, such as efficiently managing electrical use and the cost associated with that use, reducing vehicle mileage in vehicular applications, and reducing $CO_2$ emissions in fossil fuel applications. Based on the sensed parameters, the smart sensor may be configured to calculate a SoC of the battery module, or a component of the battery module.

Additionally, the smart sensor 210 may be configured to provide a number of diagnostic features, such as during production and operation of the generator-based battery charging system 100. For example, the smart sensor 210 may be configured to log and/or report diagnostic trouble codes, record historical battery information and/or may be programmed to perform certain warranty operations (e.g., a firmware upgrade). In some cases, the smart sensor 210 may be configured to store information about the battery including the age of each battery, battery cell or battery module, an associated manufacturer of the battery, battery cell or battery module, a battery type or types of each component of the battery module, and the like. In some cases, the battery module 140 may include a memory device storing battery information such as the age of each battery, battery cell or battery module, an associated manufacturer of the battery, battery cell or battery module, a battery type or types of each component of the battery module, and the like. In such cases, the smart sensor 210 may be capable of uploading battery information from the battery module 140. In some cases, the smart sensor 210 may be used to reduce vehicle breakdowns, or other electrical device downtime, due to weak batteries— which may be up to 50% of reported downtime. The smart sensor 210 may be configured to operate with a plurality of battery types and/or voltage levels, where a single device may be integrated into an existing control system using a standardized communication protocol (e.g., CANBus J1939), or a customizable communication protocol.

In some cases, the smart sensor may be configured to operate within a temperature range of between −40° C. and +105° C. The smart sensor may be configured to operate within a specified voltage range (e.g., about 0 V to about 40 V, about 12 volt to about 80V, and the like). In an illustrative vehicle based example, the smart sensor 210 may be configured to measure a battery voltage (e.g., 14V to about 28V, from about 0V to about 40 V with a specified precision (e.g., ±0.01, ±0.1, etc.). The current sensors may be configured to measure current within a specified range (e.g., from about 0.2 A to about 1000 A, etc.) with a specified precision (e.g., about ±1%, ±0.5%, etc.). The temperature sensors may be configured to measure temperatures within a specified range (−40° C. and +105° C.) with a specified precision (e.g. about ±0.1° C., etc.). In some cases, the processor 250 may be configured to process an algorithm for measuring and/or conditioning a battery voltage so that the generator voltage regulator or controller 110 may be able to use this information for real-time compensation of voltage drop across cables to the battery.

In some cases, the smart sensor may be configured to perform data collection, such as on current consumption, in sleep mode for continued monitoring capability during inactive periods. The data log 265 may be capable of storing large amount of data over a period of time (e.g., about 40 hours, about 65 hours, about 100 hours, etc.). Further, the smart sensor may be capable of generating histograms representative of all parameters with up to 1 million hours being a theoretical limit. The smart sensor 210 may include a status LED showing a status of the smart sensor, a component of the smart sensor (e.g., a sensor status), and/or a battery module charge status. For example, a charged battery status may be indicated by a first color (e.g., green), a charging status may be indicated by a second color (e.g., yellow), and a discharged status threshold level may be indicated by a third color (e.g., red). In some cases, the smart sensor may include one or more other status indicators, such as a textual indicator, a graphical indicator, an audio indicator, and the like.

In some cases, specialized algorithms may be implemented to monitor and/or manage battery energy usage and/or charging via customizable algorithms. For example, in a vehicular application the smart sensor may assist engine start/stop idling functionality by monitoring battery SOC and adjusting the charging algorithms accordingly.

Figures 4A, 4B:
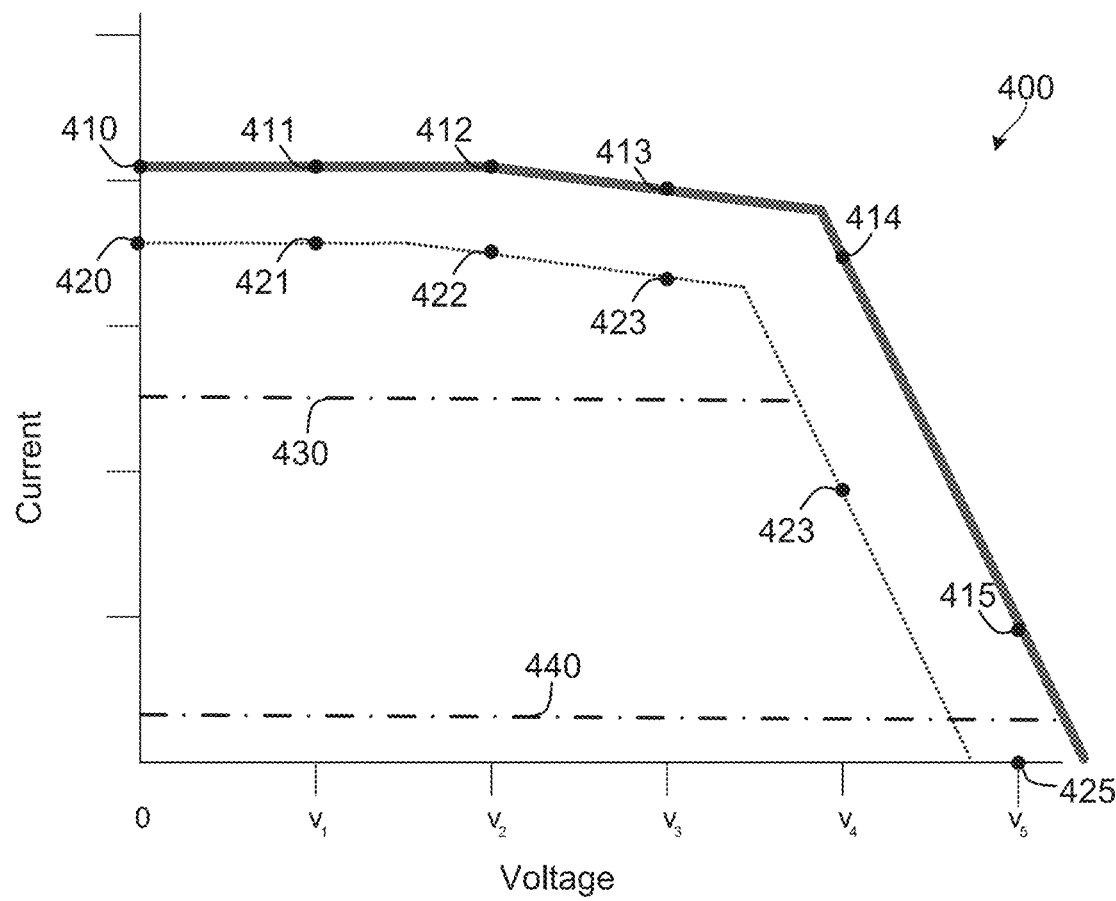
FIGS. 4A and 4B show an illustrative representation of a charging profile according to aspects of the disclosure.

FIGS. 4A and 4B show an illustrative representation 400, 450 of a charging profile according to aspects of the disclosure. In some cases, the charging profile may be illustrated in a graphical format, such as in a chart 400. The charging profile 400 may be individually generated for each battery module, by type of battery (e.g., Li-ion, Ni metal hydride, lead acid, etc.), module configuration, number of batteries, number of battery cells, manufacturer specific characteristics, and the like. In the illustrative example, 400, a Li-ion charging profile is illustrated, showing a current command value along the y axis and a battery voltage level along the x axis. Unlike traditional battery charging schemes or profiles, the current command value is not necessarily constant over a time or voltage range. Rather, the current command may vary in near real-time based on the real-time measured voltage at the battery. In some cases, the charging profile may include a maximum current profile 410 or a maximum current profile 410 and a minimum current profile 420. The maximum current profile may be determined based on manufacturer provided information, measured values and/or interpolated results. In some cases, the command current may be allowed to be anywhere within the maximum current profile 410 and the minimum current profile 420. In some cases, the maximum and minimum current profiles may mirror each other. In other cases, the minimum current profile 420, 440 may be different than the maximum current profile 410.

In some cases, the charging profile 400 may be represented in a tabular format, such as in charging profile 450. For example, a command current value (e.g., $I_1$, $I_2$, $I_3$, etc.) may correspond to a measured voltage value (e.g., $V_1$, $V_2$, $V_3$, etc.). In some cases, the controller may interpolate between points. In other cases, the current command value may remain constant or increase/decrease at a defined rate (e.g., slope). In some cases, the charging profile may be represented as an algorithm as a function of voltage and/or temperature.

Figure 5:
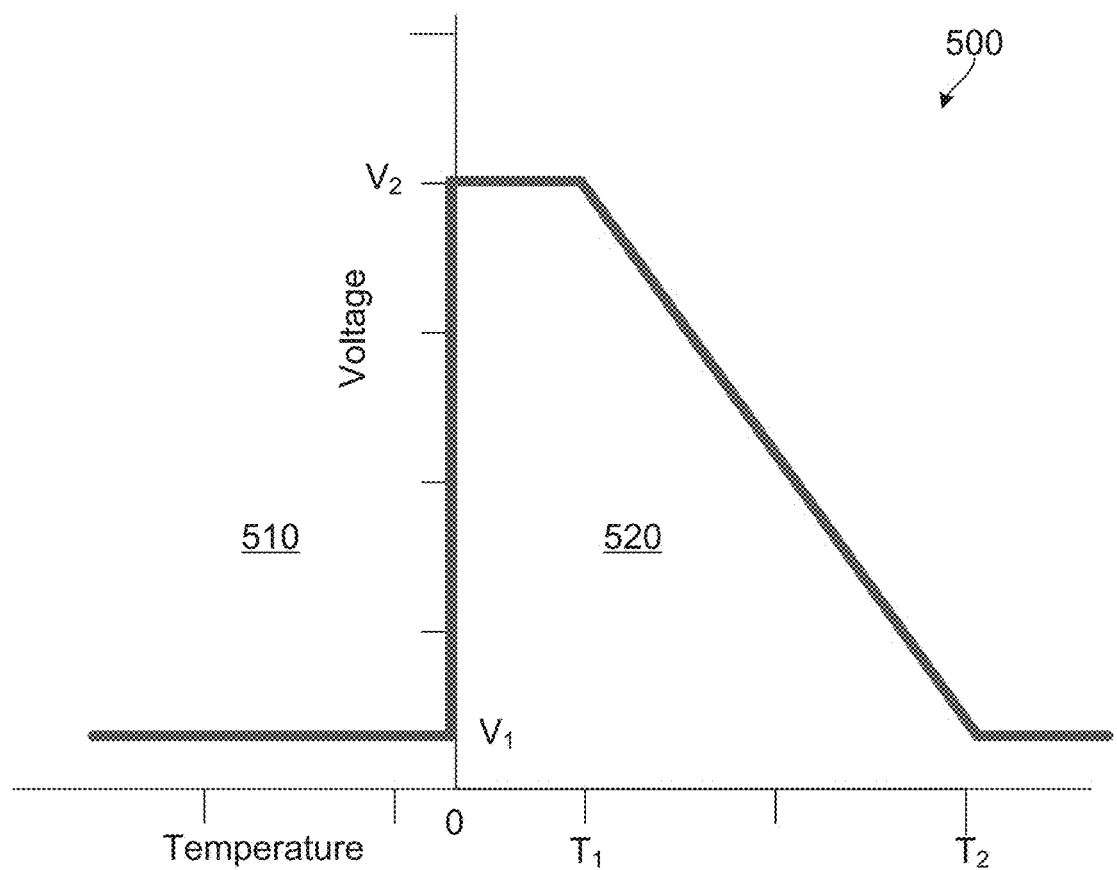
FIG. 5 shows an illustrative charging profile for a mixed-type battery module according to aspects of the disclosure.

FIG. 5 shows an illustrative charging profile 500 for a mixed-type battery module according to aspects of the disclosure. In some cases, a battery module 140 may include a plurality of battery types, such as a battery module having both Li-ion batteries and lead acid batteries, or another combination of battery types. In such cases, the battery characteristics may differ based on the individual characteristic of the used battery types. To allow for safe and efficient charging of such mixed-type battery modules, a charging voltage limit may be set based on a sensed temperature (e.g., a real time temperature signal). In the illustrative example, the charging profile 500 may include two or more charging profile sections 510 and 520. For example, section 510 may correspond to a first voltage $V_1$ command at temperature readings of less than or equal to a first temperature threshold (e.g., 0° C.), a second voltage command $V_2$ over a second temperature range from 0 to T1, a third ramped voltage command over a third temperature range T1 to T2, and a fourth voltage command ($V_1$) over a fourth temperature range equal to or greater than T2. In some cases, the command voltage profile 500 may be interpolated as a function of temperature between two or more specified command voltage and temperature pairs.

Figure 6:
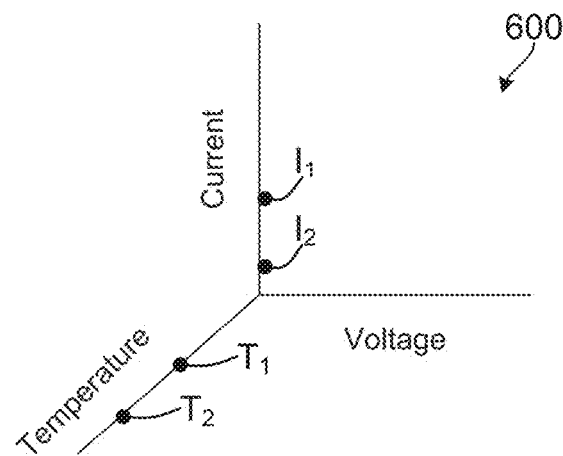
FIG. 6 shows illustrative representation of a charging profile variable system according to aspects of the disclosure.

FIG. 6 shows illustrative representation of a charging profile variable system 600 according to aspects of the disclosure. In many cases, two or more charging profiles may be identified for a particular battery module. For example, a first charging profile (e.g., charging profile 400) may be defined for use at a specified nominal temperature (e.g., 30° C.) or within a nominal temperature range. In some cases, the nominal temperature or nominal temperature range may correspond to a nominal operating temperature as specified by a battery manufacturer. In some cases, battery operation, discharging characteristics and/or charging characteristics can change based on certain operating conditions. For example, for a Li-ion battery, the charging characteristics may change dependent upon a temperature of the battery. Similarly, for mixed battery type battery modules, the charging characteristics may change based on current flow through the battery during charging. For example, specified voltage command may cause one battery type to heat more than a second battery type.

In such cases, the selected charging profile may be dependent on temperature, current and voltage. As can be seen, a charging profile may be generated within a three-dimensional space (or three dimensional table or data structure) such that changing conditions may be accounted for during charging operations. For example, a charging profile may be generated as a three dimensional surface to allow the controller 110 to command the generator to output a specified voltage and a specified current based on a particular sensed temperature. In mixed battery operations the real-time sensed charging current may cause the controller 110 to switch charging profiles based on expected heating or measured heating of different battery components in the battery module. For example, a Li-ion battery module may be charged using a first profile (e.g., a current vs voltage charging profile such as charging profile 400) when the temperature is within a range near Temperature $T_1$. The controller 110 may switch to a second charging profile when the temperature comes within a second temperature range near $T_2$. Similarly, for mixed battery modules using a voltage vs temperature profile such as profile 500, the controller may be configured to use a third charging profile when the charging current is within a range near a first current I1 and a second charging profile when the charging current is within a range near a second current I2. In some cases, the charging profile and/or the threshold conditions for switching between different charging profiles may be dependent on a battery type installed as part of the battery module 140.

Figure 7:
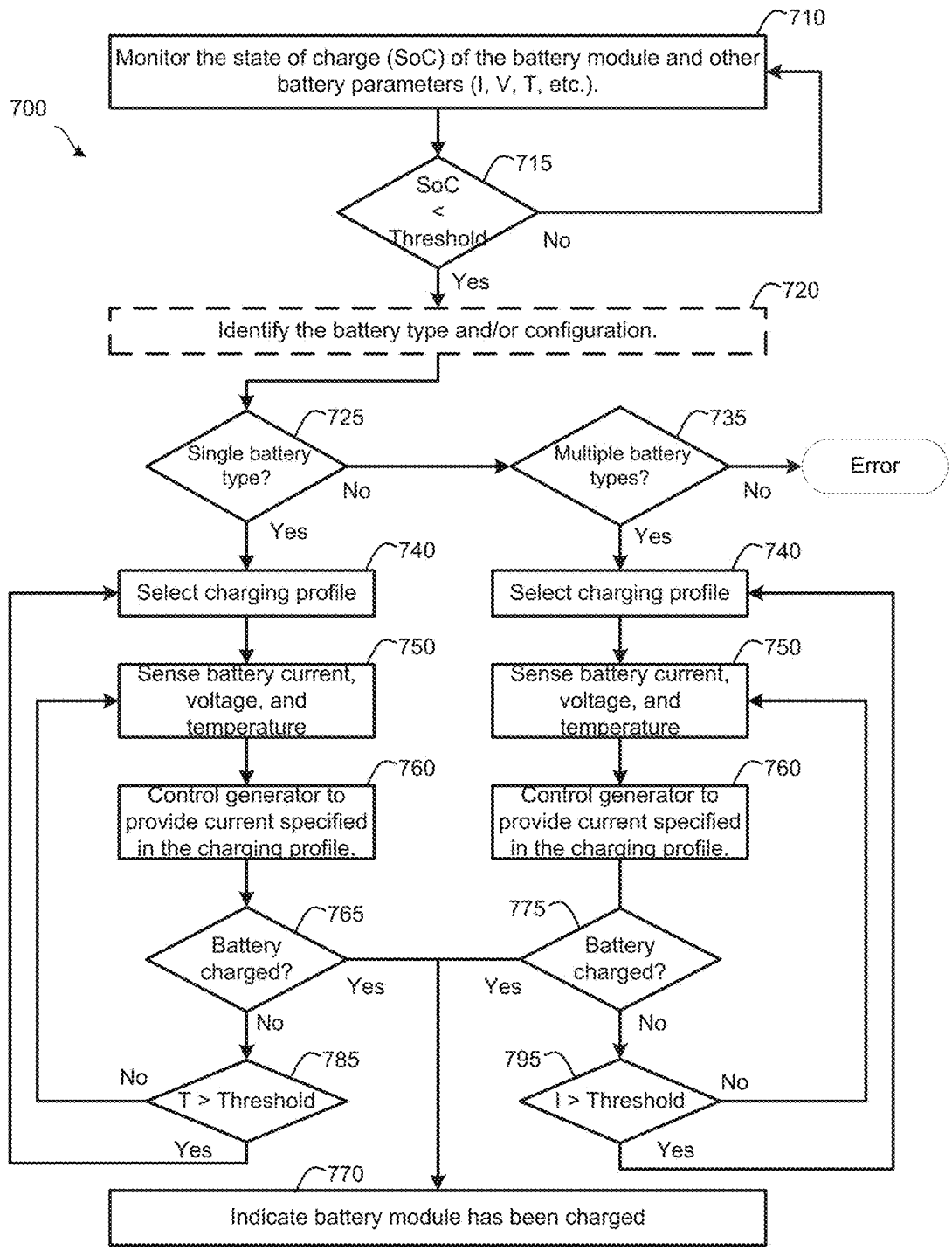
FIG. 7 shows an illustrative method of battery charging using a charging profile according to aspects of the disclosure.

FIG. 7 shows an illustrative method 700 of battery charging using a charging profile according to aspects of the disclosure. For example, at 710, the controller 110 may be configured to monitor a state of charge of the battery module 140, along with other battery module parameters (e.g., current, voltage, temperature, etc.) during operation, such as when the generator is operating and/or the electrical load 130 is drawing electrical energy from the battery module 140. In some cases, the controller may receive one or more of the monitored values in near real-time from the sensor 150. At 715, periodically or continuously, the controller may determine whether the SoC has met a predefined threshold condition. If not, the controller continues to monitor the battery module parameters at 710. If so, the controller 110 may identify a battery type and/or battery module type used within the battery module 140 at 720. In some cases, the controller 110 may be pre-configured with the battery type information and retrieve the information from the memory 160. In other cases, the controller 110 may obtain the battery type information from a memory device stored on the sensor 150 and/or a memory device installed as part of the battery module. In some cases, the battery type information may include a number of batteries and/or cells installed as part of the battery module 140, a type of each battery or cell installed in the battery module, a configuration type of the battery module (e.g., series connection, parallel connection, a mixed series and parallel connection.

At 725, the controller 110 may determine whether a single battery type has been used. If so, the controller 110, at 740, may select a first charging profile (e.g., current profile 400 for an illustrative Li-ion battery module) based on the identified battery type, the identified module configuration, and one or more battery parameters (e.g., a real-time current value, a real-time voltage, a real-time temperature, etc.). If not, at 735 the controller 110 may determine whether multiple battery types are installed. If so, at 740 at charging profile may be selected by the controller (e.g., the charging profile 500) corresponding to the identified battery types, the configuration of the battery module, and one or more battery parameters (e.g., a real-time current value, a real-time voltage, a real-time temperature, etc.). If the battery module configuration cannot be identified, the controller may issue an error and/or may follow a predefined charging profile, such as a multiple battery type charging profile.

At 750, the controller 110, along with the sensor 150, may monitor the battery current, voltage and temperature in real-time, near real-time, or by sampling at predetermined intervals. At 760, based on the sensed current, voltage and/or temperature, the controller issues a command to the generator 120 to either output a commanded current and/or a commanded voltage based on the selected profile. At 765 or 775, the controller 110 may determine based on the sensed battery parameters, an indication of whether the battery module has been charged (e.g., met a charging criteria such as a predefined SoC, voltage and/or current level). If so, the controller 110 will end the charging procedure at 770 and/or output an indication that the battery module 140 has been charged. If not, the controller 110 may identify whether a charging criterion (e.g., a temperature threshold at 785, a current threshold at 795, etc.) has been reached. If not, the controller 110 continues to sense the battery parameters at 750. If so, the controller 110 may be configured to determine whether to use a different charging profile at 740, based on the sensed battery parameters and/or the battery module type or configuration.

While this disclosure describes in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:

1. A system, comprising:
   an alternator controlled to provide electrical power to a vehicular electric power system;
   a battery module electrically connected to the vehicular electric power system, wherein the battery module comprises a first battery and a second battery;
   a sensor located adjacent the battery module, the sensor being configured to sense a real-time condition of the battery module;
   a first non-transitory memory device storing a plurality of charging profiles, wherein each charging profile of the plurality of charging profiles corresponds to a different temperature of the battery module and wherein each charging profile comprises a non-constant value over a voltage range; and
   a controller comprising a processor and a second non-transitory memory device storing instructions that, when executed by the processor, cause the controller to:
      identify, from the battery module, a battery module configuration, the battery module configuration comprising a first battery chemistry type of the first battery and a second battery chemistry type of the second battery and, when two or more battery cells are included in the battery module, a configuration of the first battery and the second battery;
      receive, from the sensor and in real-time, a temperature sensing signal, a voltage sensing signal, and a current sensing signal;
      determine, in real-time, a temperature of the battery module based the temperature sensing signal, a voltage level of the battery module based on the voltage sensing signal and a current flow at the battery module based on the current sensing signal;
      select, from the first memory device and based on the real-time temperature of the battery module and the battery module configuration, a first charging profile of the plurality of charging profiles, wherein each charging profile of the plurality of charging profile corresponds to a different temperature of the battery module;
      obtain, from the selected charging profile and based on a sensed real-time voltage of the battery module obtained from the voltage signal, a current command value; and
      control, using the current command value as a set point, generation of electrical energy by the alternator, wherein the alternator outputs electrical energy corresponding to the current command value obtained in real time from the selected charging profile based on a real-time measured voltage of the battery.

2. The system of claim 1, wherein the instructions further cause the controller to:
   determine, from the temperature sensing signal, whether a current temperature of the battery module is within a first temperature range or a second temperature range; and
   select, based on a first indication that the temperature sensing signal is within the first temperature range, the first charging profile; and
   select, based on a second indication that the temperature sensing signal is within the second temperature range, the second charging profile.

3. The system of claim 1, wherein the first battery chemistry type is different than the second battery chemistry type.

4. The system of claim 1, wherein the first battery chemistry type of the first battery comprises one of a lithium-ion type, a lead acid type, and a nickel-metal hydride type and the second battery chemistry type of the second battery comprises a different one of the lithium-ion type, the lead acid type, and the nickel-metal hydride type.

5. The system of claim 1, wherein the first battery is connected in parallel with the second battery.

6. The system of claim 1, wherein the battery module further comprises a third battery, wherein the third battery is connected in series with one of the first battery or the second battery.

7. The system of claim 6, wherein the first battery is connected in parallel with the second battery.

8. The system of claim 1, wherein the first charging profile comprises a minimum charging current profile and a maximum charging current profile.

9. The system of claim 8, wherein the instructions further cause the controller to determine, from the first charging profile, a charging current between the minimum charging profile and the maximum charging profile based on a sensed voltage value.

10. The system of claim 1, wherein the first charging profile comprises an algorithm as a function of measured voltage and temperature.

11. The system of claim 1, wherein the first charging profile comprises a three dimensional profile of voltage, current and temperature values, wherein, a current command is selected based on a sensed temperature and voltage.

12. The system of claim 1, wherein the instructions further cause the controller to initiate a battery charging sequence based on a calculated state of charge (SoC) of the battery module meeting an SoC threshold condition or an identified depth of discharge (DoD) of the battery module meeting a DoD threshold.

13. The system of claim 1, wherein the instructions further cause the controller to issue an error based on a failure to identify the battery module configuration.

14. The system of claim 1, wherein the instructions further cause the controller to select, based on a failure to identify the battery module configuration, a charging profile configured for a battery module comprising a multiple of battery types.

15. The system of claim 1, wherein the current command value varies in near real-time based on a real-time measured voltage at the battery module.

16. The system of claim 1, wherein the instructions further cause the controller to convert, via a rectifier, alternating power output from the generator to direct current.

17. An alternator controller, comprising:
a processor;
a control output communicatively coupled to an alternator providing electrical power to a vehicular electric power system;
an input communicatively coupled to a sensor located adjacent a battery module electrically connected to the vehicular electric power system, wherein the sensor is configured to sense a real-time condition of the battery module;
a first non-transitory memory storing a plurality of charging profiles, wherein each charging profile of the plurality of charging profiles corresponds to a different temperature of the battery module and wherein each charging profile comprises a non-constant value over a voltage range; and
a second non-transitory memory storing instructions that, when executed by the processor, cause the controller to:
identify, from the battery module, a battery module configuration, the battery module configuration comprising a first battery chemistry type of a first battery of the battery module and a second battery chemistry type of a second battery of the battery module;
identify, based on an identification that two or more battery cells are included in the battery module, a connection configuration of the two or more battery cells included in the battery module;
receive, in real-time via the input and from the sensor, a temperature sensing signal, a voltage sensing signal, and a current sensing signal;
determine, in real-time, a temperature of the battery module based the temperature sensing signal, a voltage level of the battery module based on the voltage sensing signal and a current flow at the battery module based on the current sensing signal;
select, from the first non-transitory memory and based on the real-time temperature of the battery module and the battery module configuration, a first charging profile of the plurality of charging profiles, wherein each charging profile of the plurality of charging profile corresponds to a different temperature of the battery module, wherein each charging profile of the plurality of charging profiles corresponds to a different temperature of the battery module, and wherein each charging profile of the plurality of charging profiles comprises a non-constant value over a voltage range;
obtain, from the selected charging profile and based on a sensed real-time voltage of the battery module obtained from the voltage signal, a current command value; and
send, via the output and to the alternator, a command signal to control generation of electrical energy by the alternator, wherein the command signal is based on the current command value as a set point and wherein the command signal corresponds to the current command value obtained in real time from the selected charging profile based on a real-time measured voltage of the battery.

18. The system of claim 17, wherein the instructions further cause the controller to:
determine, from the temperature sensing signal, whether a current temperature of the battery module is within a first temperature range or a second temperature range; and
select, based on a first indication that the temperature sensing signal is within the first temperature range, the first charging profile; and
select, based on a second indication that the temperature sensing signal is within the second temperature range, the second charging profile.

19. The system of claim 17, wherein the first charging profile comprises a three dimensional profile of voltage, current and temperature values, wherein, a current command is selected based on a sensed temperature and voltage.

20. Non-transitory memory storing instructions that, when executed by a processor, cause an alternator controller of a vehicular power system to:
identify, from a battery module of the vehicular power system, a battery module configuration, the battery module configuration comprising a first battery chemistry type of a first battery of the battery module and a second battery chemistry type of a second battery of the battery module;
identify, based on an identification that two or more battery cells are included in the battery module, a connection configuration of the two or more battery cells included in the battery module;
receive, in real-time via an input and from a sensor, a temperature sensing signal, a voltage sensing signal, and a current sensing signal;
determine, in real-time, a temperature of the battery module based the temperature sensing signal, a voltage level of the battery module based on the voltage sensing signal and a current flow at the battery module based on the current sensing signal;
select, from the non-transitory memory and based on the real-time temperature of the battery module and the battery module configuration, a first charging profile of a plurality of charging profiles, wherein each charging profile of the plurality of charging profile corresponds to a different temperature of the battery module;
select, based on a failure to identify the battery module configuration, a charging profile configured for a battery module comprising a multiple of battery types;
obtain, from the selected charging profile and based on a sensed real-time voltage of the battery module obtained from the voltage signal, a current command value; and
send, via an output and to the alternator, a command signal to control generation of electrical energy by the alternator, wherein the command signal is based on the current command value as a set point and wherein the command signal corresponds to the current command value obtained in real time from the selected charging profile based on a real-time measured voltage of the battery.

* * * * *